May 8, 1956
A. L. GALLANT
2,744,489
RIBBON INDICATOR INSTRUMENT
Filed May 27, 1953
3 Sheets-Sheet 1
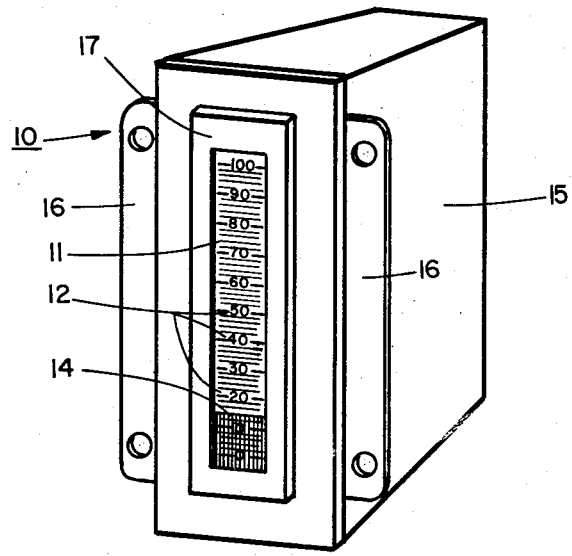
FIG. I
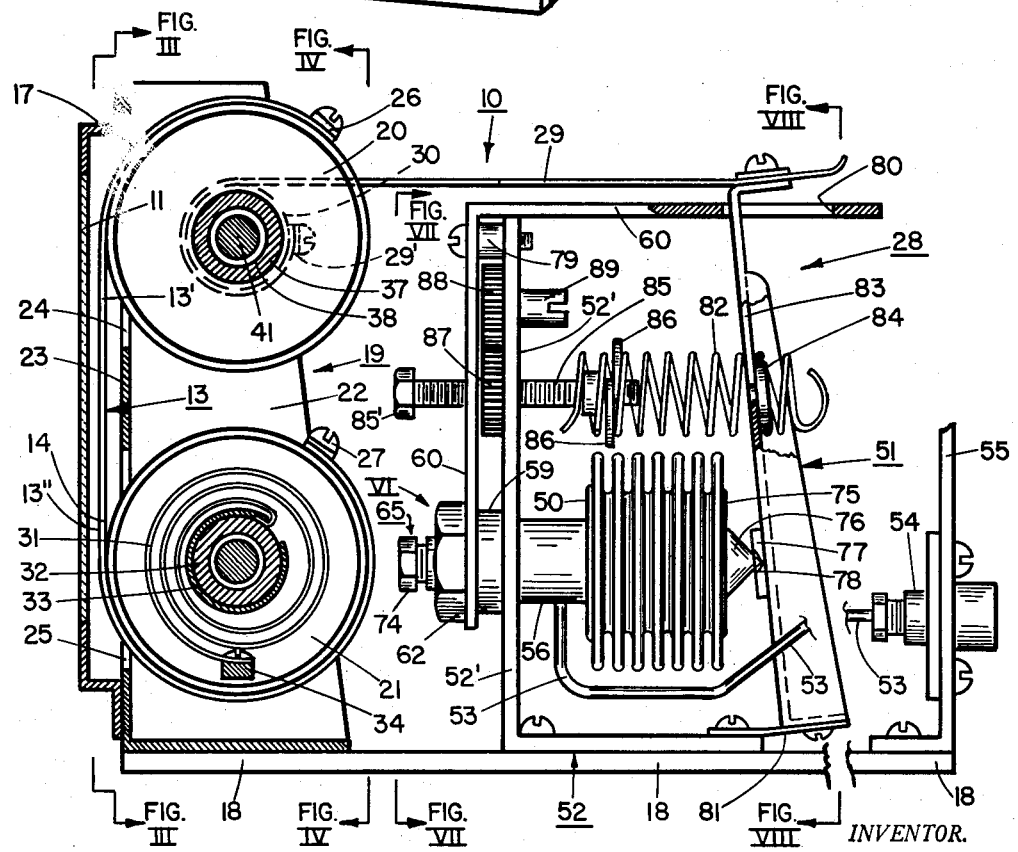
FIG. II
INVENTOR.
ALBERT L. GALLANT
BY
Curtis, Morris + Safford
ATTORNEYS

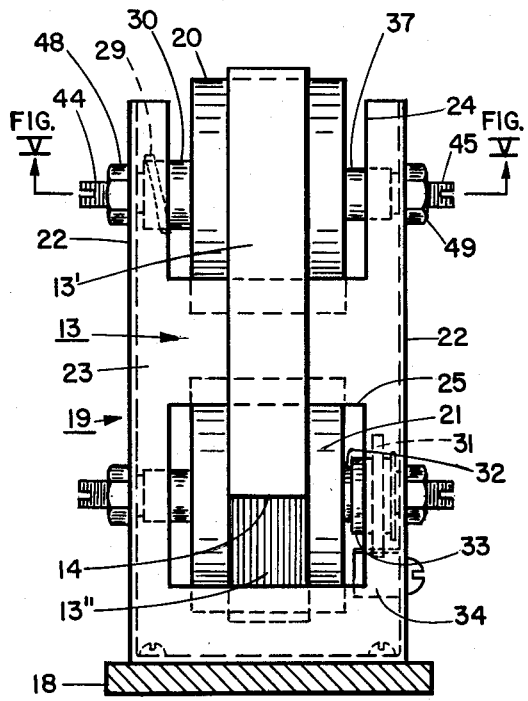
FIG. III
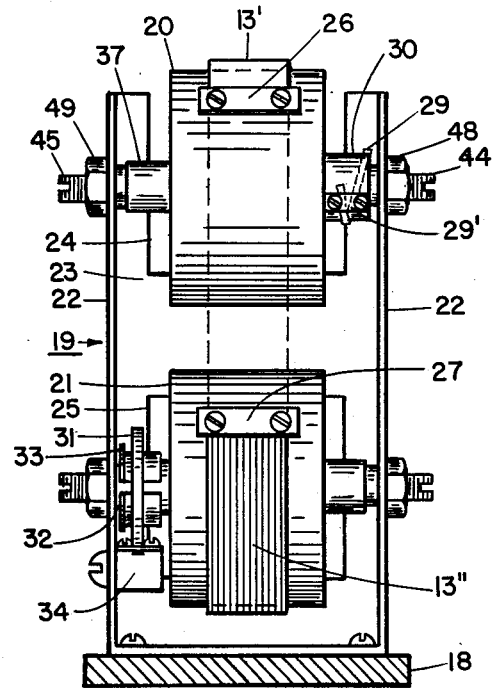
FIG. IV
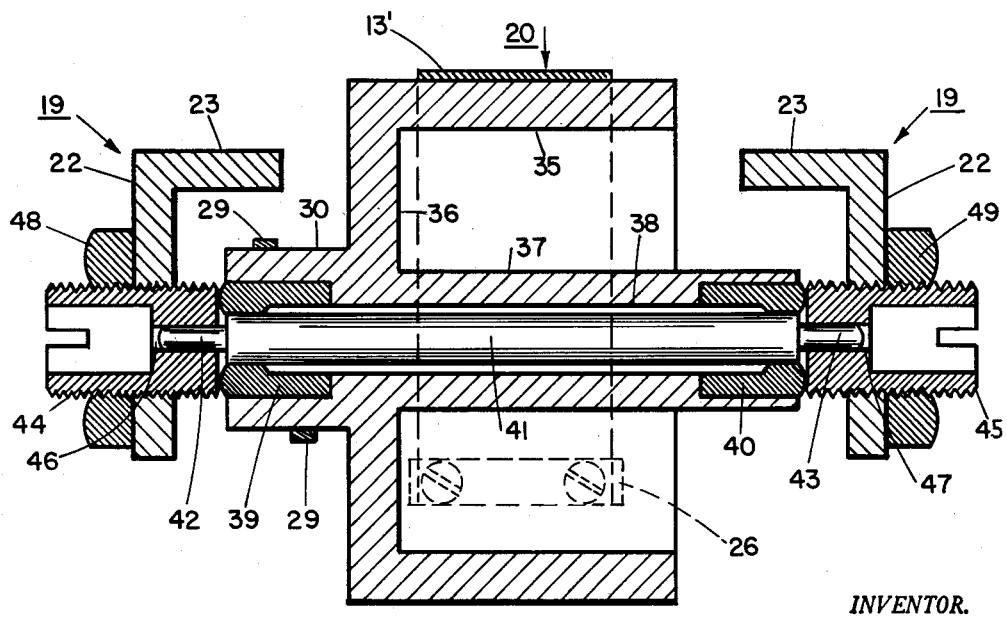
FIG. V

May 8, 1956   A. L. GALLANT   2,744,489
RIBBON INDICATOR INSTRUMENT
Filed May 27, 1953   3 Sheets-Sheet 3
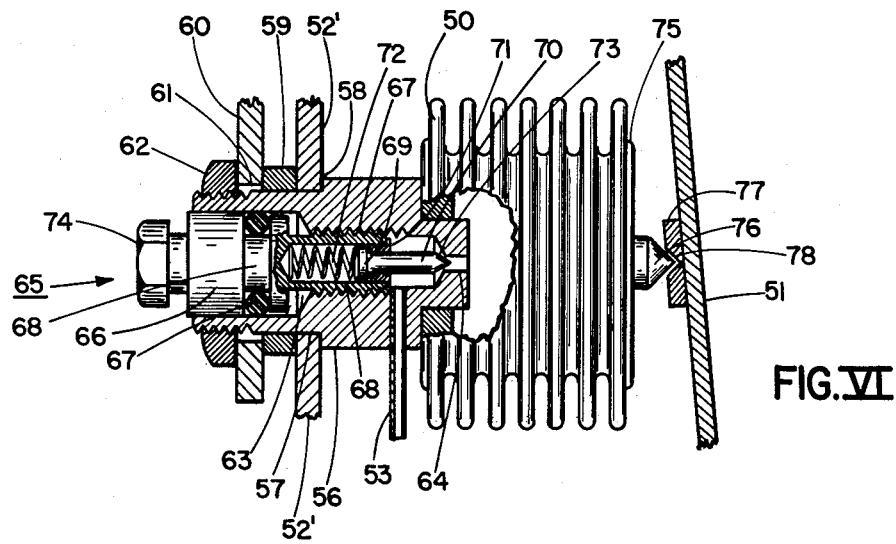
FIG. VI
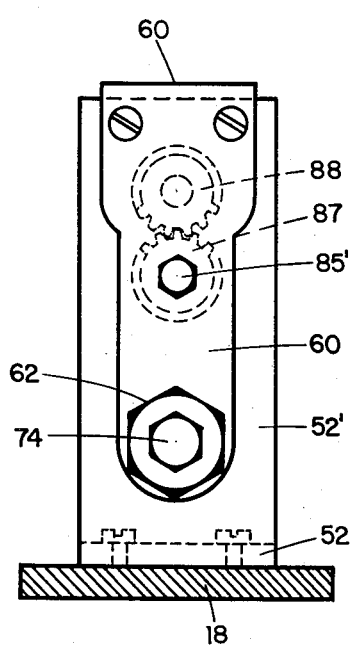
FIG. VII
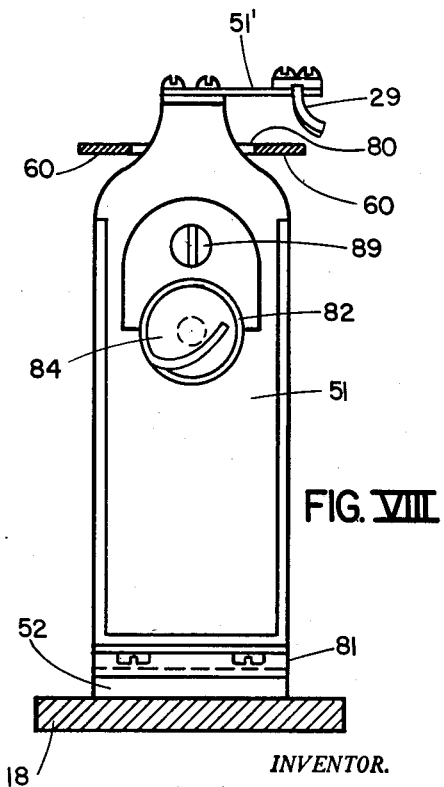
FIG. VIII
INVENTOR.
ALBERT L. GALLANT
BY
Curtis, Morris & Safford
ATTORNEYS United States Patent Office 2,744,489
Patented May 8, 1956

2,744,489
RIBBON INDICATOR INSTRUMENT

Albert L. Gallant, Attleboro Falls, Mass., assignor to The Foxboro Company, Foxboro, Mass., a corporation of Massachusetts Application May 27, 1953, Serial No. 357,790

1 Claim. (Cl. 116—129)

This invention relates to indicating instruments which are responsive to changes in a variable condition, and has particular reference to such instruments wherein a traveling ribbon is used as an indicating device.

In modern instrumentation, particularly in industry, there are two factors which relate especially to this invention. First, measurement of variable conditions such as flow, pressure, temperature, etc., has become so refined that in meeting modern large scale and involved operations it is necessary to look to the associated instrumentation and to invent means which refine indication and control to a point of favorable comparison with measurement. This invention takes a step in this direction in the field of indication by providing delicately responsive apparatus, with a double bearing rotary shaft arrangement as a feature thereof. Second, modern instrumentation often requires a compact grouping of many instruments on a single panel unit. It is, therefore, desirable to reduce the frontal face size of many instruments in order to more efficiently use multi-instrument panel space. In the case of indicating instruments such size reduction raises the problem that it is difficult, with prior indicating structures, to see the indication from a distance, even to get a quick approximation of the value indicated. It is important from an efficiency standpoint that an instrument operator or maintainance man be able to get such an approximation from a distance, and this invention provides means which makes this possible. A feature of this means in this invention is a ribbon of contrasting colors with a color dividing line as an indicator line.

It is an object of this invention to provide a new and improved ribbon indicating instrument.

Another object is to provide indicating instrument ribbon unit structure which is substantially improved in delicacy and accuracy of response to changes in a variable condition.

A further object is to provide an indicating instrument of comparatively small frontal face size, which is readily readable at a distance for at least an approximation of the value indicated.

Other objects and advantages of this invention will be in part apparent and in part pointed out hereinafter in the specification and in the accompanying drawings, which ilustrate a preferred embodiment of the present invention, and wherein:

Figure I is a general perspective view of the exterior of a ribbon indicating instrument embodying this invention;

Figure II is a side view of the instrument of Figure I with the cover removed, partially in section and showing in side elevation the indicating ribbon supporting drums and the condition responsive bellows that positions the ribbon;

Figure III is a view taken as on line III—III of Figure I and is a front elevation of the indicating ribbon and its supporting drums;

Figure IV is a view taken as on line IV—IV of Figure I and is a rear elevation of the ribbon drum assembly;

Figure V is a view taken as on line V—V of Figure III and is an axial horizontal section, on an enlarged scale, through the upper ribbon drum showing details of the mounting of the drum;

Figure VI is a view of the structure indicated by VI in Figure I and is a side elevation, partly in section of the condition responsive bellows and its mounting;

Figure VII is a front elevation of the condition responsive bellows assembly taken on line VII—VII of Figure II; and Figure VIII is a rear elevation of the bellows assembly taken on line VIII—VIII of Figure II.

The indicating instrument shown in the accompanying drawings is constructed with substantial depth as a means of providing a relatively small frontal area in the instrument to make it suitable for multi-instrument panel arrangements.

Figure I shows a perspective view of the instrument, 10, as a whole, and certain details at the front thereof, including a vertically disposed, relatively narrow, transparent panel 11 with indicating indicia 12 thereon. Seen more clearly in Figure II is an indicator ribbon 13 which is movable up and down in back of the panel 11 and in close proximity therewith. The ribbon 13 has an upper, white portion 13' and a lower, colored portion 13" which is preferably red, and is indicated in Figure I by parallel vertical lines. The contrasting colors of the ribbon 13 have a horizontal transverse dividing line 14 which is used as an indicator line in association with the panel indicia 12 as the ribbon is moved up or down in accordance with a change in value of a variable condition to which the indicating instrument is responsive. The instrument is provided with a housing 15, mounting wings 16, and a front cover 17 with an opening therethrough in which the transparent panel 11 is mounted.

Referring further to Figure II, the instrument 10 has a base plate 18 on the front end of which an upright housing 19 is mounted, for supporting a pair of ribbon drums 20 and 21. The housing 19 has side walls as at 22 on which the ribbon drums are mounted, and a front wall 23 with openings 24 and 25 therethrough for receiving portions of the ribbon drums. The front cover 17 of the instrument is secured to the housing 19 and is formed to stand away somewhat therefrom. The indicating ribbon 13 lies between the front wall 23 and the transparent panel 11 because the ribbon drums 20 and 21 extend forwardly through the housing openings 24 and 25. The ribbon 13 has an end wound over and secured to each of the ribbon drums by screw and binding plate units 26 and 27. In the specific device shown, the red end of the ribbon 13 is secured to the lower ribbon drum 21 and the white end of the ribbon is secured to the upper drum 22.

In the arrangement as shown, the scale 12 is so calibrated that the values represented on panel 11 increase in an upward direction, and the ribbon color dividing line 14 is movable up and down along the scale, with the red portion of the ribbon below the dividing line. Thus a simulation of an ordinary liquid thermometer is provided, with an apparent indicating column which is wide and consequently readily visible from a substantial distance to show an approximation of the indicated value. For close observation, this instrument provides delicate and accurate response and indication, as will be shown hereinafter.

The ribbon 13 is moved in response to variable condition value change through rotary movement of the ribbon drums 20 and 21. These drums are moved in one direction by a condition responsive unit 28 through a flexible metal strip 29 which is wound about and secured by a clamp plate 29' to an arbor 30 integral with the upper ribbon drum 20. The drums and ribbon are biased in opposition to this movement and for return movement by a flat spiral spring 31 operating on the lower ribbon drum 21. The spring 31 is disposed about and has one end secured to an arbor 32 integral with the lower ribbon drum 21. A split sleeve 33 fits over the arbor 32 as a means of securing the spring 31 thereto. The other end of the spring 31 is secured to a fixed block 34 which is mounted on the side wall 22 of the housing 19. The drums 20 and 21 have cylindrical outer diameter portions on which the ribbon 13 is wound. There are no edges or projections to engage the edges of the ribbon, thus eliminating a possibility of friction on the ribbon.

The disposition and arrangement of the ribbon drums 20 and 21, with the ribbon 13, the housing 19, and the associated mechanisms and structure, is further shown in Figures III and IV which are, respectively, front and rear views of the ribbon drum unit with the instrument cover 17 and the housing 15 removed.

Figure V shows the detail of the structure and assembly of the upper ribbon drum 20, in accordance with a section taken on line V—V of Figure III. This is the same as the structure and assembly of the lower ribbon drum 21, except for the differences with respect to the flexible actuating strip 29, the bias spring 31, the spring securing sleeve 33, and certain arbor diameter differences. A feature of these structures and assemblies is the double bearing drum support arrangement with each drum rotatable on a fixed axis, as will be seen hereinafter.

In Figure V, the ribbon drum 20 is shown as mounted on and between the side walls 22 of the housing 19. The drum 20 is in the form of a hollow cylinder having one end open, a side wall 35, and a base 36. The previously mentioned drum actuation arbor 30 is integral with the drum and extends axially therefrom, outside the cylinder. A second arbor, 37, also integral with the drum, extends axially thereof within the cylinder from the base 36 to a point beyond the open end of the cylinder. The two arbors 30 and 37 are axially aligned, and the drum is provided with an axial opening 38 extending through both arbors and the base 36. At the outer end of each arbor the axial opening 38 is provided with a radial step enlargement, and bearing sleeves 39 and 40 are located therein. The bearing sleeves 39 and 40 have outer end crowned bearing faces and inner diameter bearing surfaces of less diameter than that of the axial opening 38, and a bearing shaft 41 extends through the axial opening 38 in bearing relation with the inner diameter bearing surfaces of the sleeves and in spaced relation with the wall of the axial opening 38. Thus the drum 20 is rotatably mounted on the shaft 41.

The ends of the shaft 41 extend outwardly beyond the outer ends of the arbors 30 and 37 in reduced diameter to form cylindrical and axial bearing portions 42 and 43. The shaft 41 is rotatably supported in the housing 19 by screws 44 and 45, which are threadedly mounted in the housing side walls 22. The screws 44 and 45 are provided with inner axial openings 46 and 47 which receive the shaft ends 42 and 43 in rotary bearing relation therewith. The screws 44 and 45 are sufficiently large to engage the crowned ends of the bearing sleeves 39 and 40 as lateral movement stop and bearing members for the drum 20. Accordingly, the screws 44 and 45 may be adjusted with respect to the housing side walls 22 and as a means of varying the friction on, or as a means of laterally adjusting, the drum 20. The screws 44 and 45 are each provided with a lock nut as at 48 and 49 respectively, for binding their respective screws to the housing side walls 22.

In Figures II, VI, VII, and VIII, the variable condition responsive unit 28 is illustrated. Briefly, a pneumatic signal, representative of a change in the variable condition, is applied to the interior of a bellows 50. Movement thus produced in the bellows is applied to a movable bracket arm 51. The flexible drum actuating strip 29 is secured to the bracket arm 51 through a laterally extending bar 51', and the bellows movement is thus translated into rotary movement of the ribbon drums 20 and 21, which in turn produces the indicating movement of the ribbon 13.

The variable condition responsive unit 28, Figure II, is mounted in the instrument as a single, readily removable assembly. A main support bracket 52 is secured to the instrument base plate 18 for this purpose. A useful feature of this invention in connection with the unit 28 is its reversibility. As shown in Figure II, the instrument arrangement is such that an increase in pressure in the bellows 50 will cause the ribbon 13 to move up, indicating a value increase. By reversing the unit 28 end for end on the base 18, an increase in pressure in the bellows 50 may be made to cause the ribbon 13 to move down, indicating a value decrease. This arrangement provides the indicating instrument of this invention with a useful versatility of application.

The bellows 50 is mounted on an upright 52' of the bracket 52, in an arrangement for horizontal movement of expansion, in a direction toward the rear of the instrument. A pneumatic signal input pipe 53 leads to the front end of the bellows 50 from the rear of the instrument by way of a pneumatic pipe connector 54 mounted on an upright 55, which is, in turn, mounted on the instrument base 18.

Figure VI shows the mounting and arrangement of the bellows 50 in detail. One end of the bellows is fixed on a hollow cylindrical stud 56 which extends forwardly through an opening 57 in the bracket upright 52', abutting thereagainst by means of a peripheral shoulder 58 on the stud 56. The stud 56 extends further forwardly through a spacing washer 59 and another bracket 60, which supports other portions of the whole unit, by means of an opening 61 therein. This assembly is held together by a nut 62, threaded on the forward end of the stud 56, which draws the stud shoulder 58 against the bracket upright 52'.

The stud 56 has a lengthwise passage 63 therethrough, which leads to the interior of the bellows 50 through a terminal end pneumatic flow restriction 64. The input signal pipe 53 opens on the passage 63 forwardly of the restriction 64. A plug assembly 65 is threadedly mounted in the passage 63 as a means of varying the restrictive effect established by the restriction 64 and thus varying the time factor of the bellows response to the pneumatic input signal. This arrangement thus provides an adjustment for adapting the instrument to produce desired response to particular pneumatic application and conditions. The plug assembly 65 has as a main body a stud 66 sealed against leakage and foreign matter by a resilient O ring 67 compressed in a peripheral slot 68 in the stud 66. The inner end of the stud 66 has a threaded mounting 67 in the passage 63, and an axially disposed recess 68. The recess 68 contains the head 69 of a restrictor closure pin 70, with a recess sleeve plug 71 retaining the pin head in the recess, and coil spring 72 within the recess as a bias on the pin 70 toward the restriction 64. The inner end of the pin 70 is tapered to a point 73 which may enter and resiliently close off the restriction 64 under the influence of the spring 72. The forward end of the stud 66 is provided with a bolt head 74 for turning the plug assembly 65 to move the pin 70 in and out of the restriction 64. The bellows 50 has a movable end 75 with a conical pin 76 mounted thereon for operative engagement with the bracket arm 51 through a bracket plate 77 which has a recess 78 therein for receiving the apex of the conical pin 75.

The bracket 60 has an upright portion paralleling the bracket upright 52' and spaced therefrom by the washer 59 and a top spacer sleeve 79. The bracket 60, further, has a top, horizontal portion overlying the bellows 50, resting on the top of the bracket upright 52', and provided with an opening 80 through which the bracket arm 51 extends upwardly, and the forward edge of which provides a limit to movement of the bracket arm 51 forwardly of the instrument. The bracket arm 51 is mounted on the base of the bracket 52 through a horizontally transverse flexure strip 81, and is connected to the uprights of the brackets 52 and 60 through a coil spring 82.

The bracket arm 51 is spring loaded and adjustable on its flexure mount 81 through the coil spring 82. An opening 83 is provided through the bracket arm 51 for receiving one end of the spring 82. A spring mounting stud 84 is attached to the bracket arm 51 at the bottom edge of the opening 83, and a bolt 85 connects the other end of the spring 82 to the uprights of the brackets 52 and 60. The bolt connection to the spring is in the form of a pair of oppositely disposed wings 86 secured to the spring end of the bolt and located between coils of the spring. The bolt 85 extends through the uprights of the brackets 52 and 60, and through a gear 87 located between the uprights and threadedly mounted on the bolt 85. A second gear, 88, is meshed with gear 87 and located thereabove. A screw stud 89 is secured to gear 88 and mounted in the upright 52'.

The range of the instrument is variable through rotary adjustment of the bolt 85. This is accomplished by turning the bolt head 85' to move the bolt wings spirally along the spring 82 between the coils thereof. This lengthens or shortens the effective length of the spring to vary its loading effect on the bellows 50. The zero of the instrument is adjustable by rotating gears 87 and 88 by rotating the screw stud 89. This has the effect of moving the bolt 85 axially, without rotation, to compress or elongate the spring 82 and consequently to adjust, at the front of the instrument, the color dividing line 14 of the ribbon 13, with respect to the panel indicia 12.

A further advantage of this invention is that the instrument may be used in any attitude, on its side, upside down, etc. Because of the drum bearing structure there is no weight or inertia problem and no loss in accuracy. The instrument may be used upside down if desired, to provide an indication which is progressive downwardly.

This invention, therefore, provides a ribbon indicating instrument which is substantially improved in delicacy and accuracy of response to changes in a variable condition, and which is readily readable at a distance for at least an approximation of the value indicated.

As many embodiments may be made in the above invention, and as many changes may be made in the embodiment above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

Bearing and support structure for use with indicating instruments of the type wherein a pair of rotatable drums are mounted side-by-side with their axes parallel and adapted for winding a marked indicator ribbon, having its ends secured respectively to said drums, from either of said drums to the other drum so that said ribbon may be positioned in accordance with the magnitude of a variable condition, and wherein scale means are provided adjacent the marking on said ribbon to permit visual reading of the value of said condition, said structure comprising, in combination: a pair of spaced support members mounted on opposite sides of one of said drums, first and second screws extending respectively through said support members and having annular bearing surfaces facing inwardly towards said one drum, each of said screws being formed with a cylindrical recess opening inwardly towards said one drum with said recesses being centrally located with respect to said annular bearing surfaces, a support shaft mounted between said two screws and having cylindrical projecting end portions extending part way into and engaging the side walls of said recesses to permit free longitudinal and rotary movement of said shaft with respect thereto, said shaft passing interiorly of said one drum and being coaxial therewith, and annular bearing means forming a part of said one drum and positioned at each end thereof in circumferential engagement with respective ends of said support shaft, said bearing means having crown portions facing outwardly of said one drum and adapted to contact said annular bearing surfaces on said screws when said screws have been adjusted to position said one drum in alignment with the other of said drums.

References Cited in the file of this patent

UNITED STATES PATENTS

| | | |
|---|---|---|
| 842,495 | Rose | Jan. 29, 1907 |
| 1,787,298 | Ziola | Dec. 30, 1930 |
| 1,804,695 | Knobloch | May 12, 1931 |
| 2,122,855 | Bombard | July 5, 1938 |
| 2,224,024 | Smith | Dec. 3, 1940 |
| 2,309,941 | Drummond | Feb. 2, 1943 |
| 2,323,709 | Ellison | July 6, 1943 |
| 2,348,362 | Rudolf | May 9, 1944 |
| 2,581,811 | Osterman | Jan. 8, 1952 |
| 2,632,474 | Jones | Mar. 24, 1953 |
| 2,664,648 | Young | Jan. 5, 1954 |
| 2,669,213 | Badger | Feb. 16, 1954 |

FOREIGN PATENTS

| | | |
|---|---|---|
| 548,720 | Germany | Apr. 18, 1932 |